US012022115B2

United States Patent
Henry et al.

(10) Patent No.: US 12,022,115 B2
(45) Date of Patent: Jun. 25, 2024

(54) METHODS AND DEVICES FOR CODING AND DECODING A DATA STREAM REPRESENTATIVE OF AT LEAST ONE IMAGE

(71) Applicant: ORANGE, Issy les Moulineaux (FR)

(72) Inventors: Félix Henry, Chatillon (FR); Mohsen Abdoli, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 250 days.

(21) Appl. No.: 17/429,174

(22) PCT Filed: Jan. 30, 2020

(86) PCT No.: PCT/FR2020/050146
§ 371 (c)(1),
(2) Date: Aug. 6, 2021

(87) PCT Pub. No.: WO2020/161413
PCT Pub. Date: Aug. 13, 2020

(65) Prior Publication Data
US 2022/0103862 A1   Mar. 31, 2022

(30) Foreign Application Priority Data

Feb. 7, 2019   (FR) ...................... 1901228

(51) Int. Cl.
*H04N 19/176* (2014.01)
*H04N 19/11* (2014.01)
(Continued)

(52) U.S. Cl.
CPC .......... *H04N 19/593* (2014.11); *H04N 19/11* (2014.11); *H04N 19/176* (2014.11); *H04N 19/182* (2014.11)

(58) Field of Classification Search
CPC .... H04N 19/593; H04N 19/11; H04N 19/176; H04N 19/182; H04N 19/70; H04N 19/105; H04N 19/119
See application file for complete search history.

(56) References Cited

U.S. PATENT DOCUMENTS

| 9,253,508 B2 | 2/2016 | Gao et al. | |
|---|---|---|---|
| 2019/0014325 A1* | 1/2019 | Lin | ...................... H04N 19/159 |
| 2020/0084471 A1 | 3/2020 | Henry et al. | |

FOREIGN PATENT DOCUMENTS

| FR | 3066873 A1 | 11/2018 |
|---|---|---|
| WO | 2014205339 A2 | 12/2014 |

OTHER PUBLICATIONS

Chun-Chi Chen et al., Description of screen content coding technology proposal by NCTU and ITRI International, Mar. 27-Apr. 4, 2014, oint Collaborative Team on Video Coding (JCT-VC) of ITU-T SG16 WP3 and IISO/IEC JTC1/SC29/WG11, JCTVC-Q0032 (Year: 2014).*

(Continued)

*Primary Examiner* — Hesham K Abouzahra
(74) *Attorney, Agent, or Firm* — David D. Brush; Westman, Champlin & Koehler, P.A.

(57) ABSTRACT

A method and device for coding and decoding a coded data stream representative of at least one image split into blocks. For a current block, a group of pixel values in the block is determined from previously decoded pixels, and for each pixel, a prediction residue is decoded. A prediction value for the pixel is determined according to a first prediction mode by predicting the pixel from at least one other previously decoded pixel belonging to the current block. Information is decoded from the stream indicating whether the pixel is predicted according to a second prediction mode using a prediction resulting from the group of pixel values in the block. When the pixel is predicted according the second (Continued)

mode, the prediction value for the pixel is replaced with a selected value of the group. The pixel is reconstructed using the prediction value associated with the pixel and the prediction residue.

13 Claims, 4 Drawing Sheets

(51) Int. Cl.
  *H04N 19/182* (2014.01)
  *H04N 19/593* (2014.01)

(56) References Cited

OTHER PUBLICATIONS

English translation of the Written Opinion of the International Searching Authority dated May 26, 2020 for corresponding International Application No. PCT/FR2020/050146, filed Jan. 30, 2020.
International Search Report dated May 11, 2020 for corresponding International Application No. PCT/FR2020/050146, dated Jan. 30, 2021.
Written Opinion of the International Searching Authority dated May 11, 2020 for corresponding International Application No. PCT/FR2020/050146, filed Jan. 30, 2020.
C-C Chen et al., "Description of screen content coding technology proposal by NCTU and ITRI International", 17 JCT-VC Meeting; Mar. 27, 2014-Apr. 4, 2014; Valencia; (Joint Collaborative Team On Video Coding of ISO/IEC JTCI/SC29/WG11 and ITU-T SG. 16); No. JCTVC-Q0032-v2, Mar. 27, 2014 (Mar. 27, 2014), XP030115918.
Y-C Sun et al., "CE15-related ; Combination of palette mode and intra prediction", No. m44233, Oct. 5, 2018 (Oct. 5, 2018), 124. MPEG Meeting; Oct. 8, 2018-Oct. 12, 2018; Macao; (Motion Picture Expert Group or ISO/IEC JTC1/SC29/WG11, XP030192576.
Guo X et al., "AHG8 : Major-color-based screen content coding", 15. JCT-VC Meeting; Oct. 23, 2013-Jan. 11, 2013; Geneva; (Joint Collaborative Team On Video Coding of ISO/IEC JTC1/SC29/WG11 and ITU-T SG.16); No. JCTVC-O0182-v3, Oct. 25, 2013 (Oct. 25, 2013), XP030115219.
Matthias Wien, "High Efficiency Video Coding, Coding Tools and Specification", Signals and Communication Technology, DOI 10.1007/978-3-662-44276-0, 2015.
Abdoli (Orange) M et al., "AHG11: Block DPCM for Screen Content Coding", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0078, Oct. 8, 2018 (Oct. 8, 2018), XP030251644.
Notification under Article 94(3) EPC dated Jul. 31, 2023 for corresponding European Application No. 20707501.1.
English translation of Notice of Reasons for Rejection dated Jan. 9, 2024 for corresponding Japanese Application No. 2021-546344.

\* cited by examiner

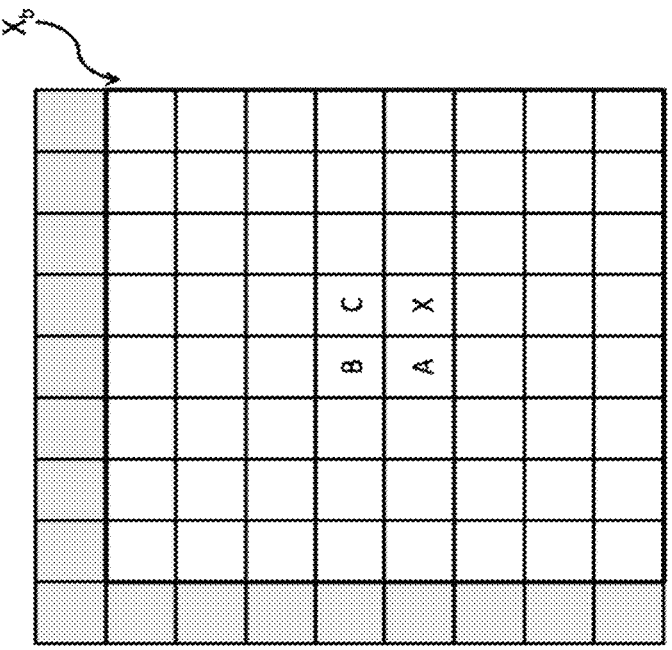

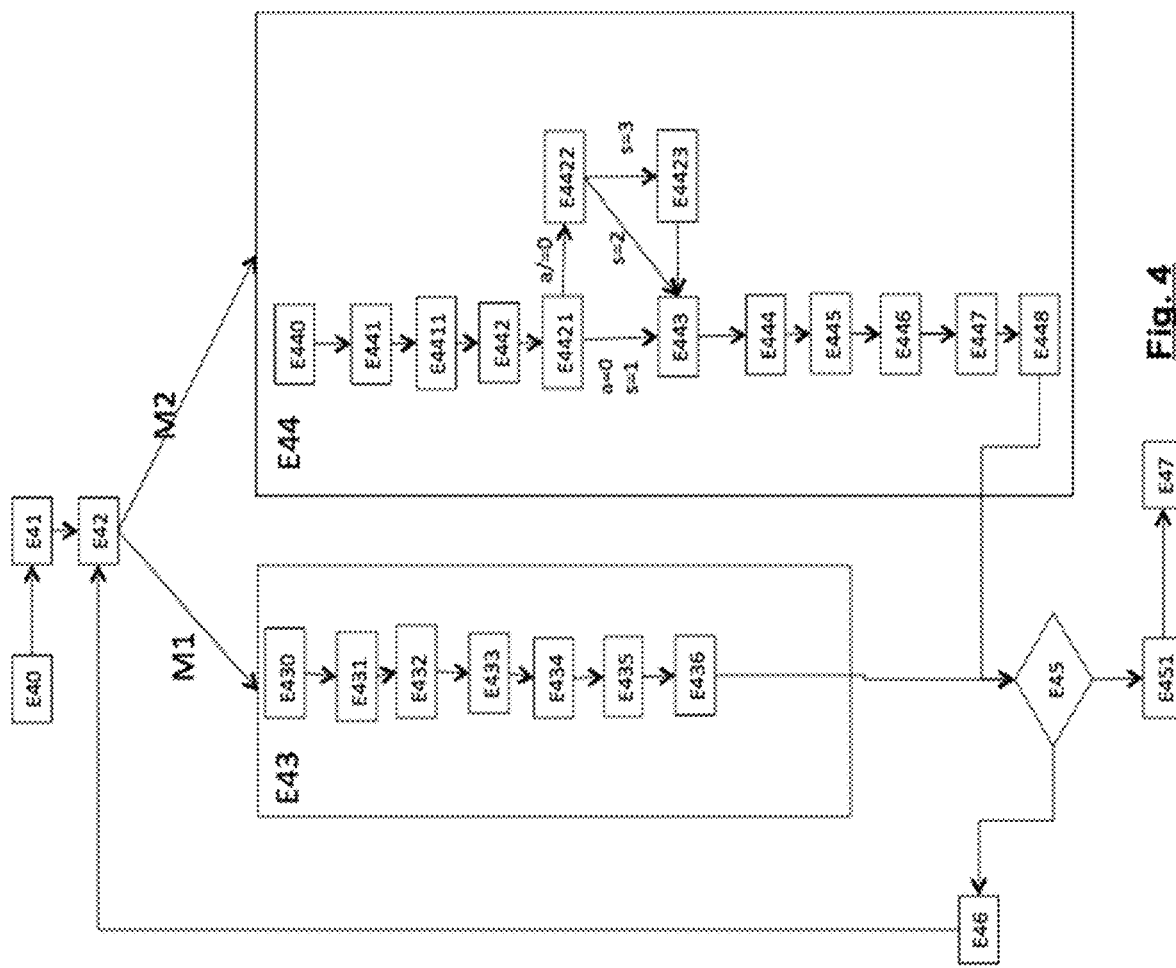

METHODS AND DEVICES FOR CODING AND DECODING A DATA STREAM REPRESENTATIVE OF AT LEAST ONE IMAGE

CROSS-REFERENCE TO RELATED APPLICATIONS

This Application is a Section 371 National Stage Application of International Application No. PCT/FR2020/050146, filed Jan. 30, 2020, which is incorporated by reference in its entirety and published as WO 2020/161413 A1 on Aug. 13, 2020, not in English.

1. FIELD OF THE INVENTION

The field of the invention is that of coding and decoding images or sequences of images, and in particular video streams.

More specifically, the invention relates to the compression of images or sequences of images using a block representation of the images.

The invention can notably be applied to the image or video coding implemented in the current or future encoders (JPEG, MPEG, H.264, HEVC, etc. and their amendments), and to the corresponding decoding.

2. PRIOR ART

Digital images and sequences of images take up a lot of space in terms of memory, which requires, when transmitting these images, to compress them in order to avoid congestion problems on the network used for this transmission.

Many techniques for compressing video data are already known. Among these, the HEVC compression standard ("High Efficiency Video Coding, Coding Tools and Specification", Matthias Wien, Signals and Communication Technology, 2015) proposes to implement a prediction of pixels of a current image in relation to other pixels belonging to the same image (intra prediction) or to a previous or subsequent image (inter prediction).

More specifically, the intra prediction uses the spatial redundancies within an image. To do this, the images are split into blocks of pixels. The blocks of pixels are then predicted using already reconstructed information, corresponding to the previously coded/decoded blocks in the current image according to the scanning order of the blocks in the image.

Furthermore, in a standard manner, the coding of a current block is carried out using a prediction of the current block, referred to as the predictor block, and a prediction residue or "residual block", corresponding to a difference between the current block and the predictor block. The resulting residual block is then transformed, for example using a DCT (discrete cosine transform) type transform. The coefficients of the transformed residual block are then quantized, coded by entropy coding and transmitted to the decoder, that can reconstruct the current block by adding this residual block to the predictor block.

The decoding is done image by image, and for each image, block by block. For each block, the corresponding elements of the stream are read. The inverse quantization and the inverse transform of the coefficients of the residual block are performed. Then, the block prediction is calculated to obtain the predictor block, and the current block is reconstructed by adding the prediction (i.e. the predictor block) to the decoded residual block.

In U.S. Pat. No. 9,253,508, a DPCM (Differential Pulse Code Modulation) coding technique for coding blocks in intra mode is integrated into an HEVC encoder. Such a technique consists in predicting a set of pixels of an intra block by another set of pixels of the same block that have been previously reconstructed. In U.S. Pat. No. 9,253,508, a set of pixels of the intra block to be coded corresponds to a row of the block, or a column, or a row and a column, and the intra prediction used to predict the set of pixels is one of the directional intra predictions defined in the HEVC standard.

However, such a technique is not optimal. Indeed, the prediction of a pixel by previously processed neighbouring pixels is well adapted to code natural type data (photos, videos). However, when the type of content is artificial, for example, content corresponding to screenshots or synthesis images, the images have strong discontinuities generating high-energy transitions.

More particularly, synthesis images, for example, are likely to contain areas with a very small number of pixel values, hereinafter also referred to as levels. For example, some areas can have only 2 levels: one for the background and one for the foreground, such as black text on a white background.

In the presence of such a transition in an area of the image, the value of a pixel to be coded is then very far from the value of the neighbouring pixels. A prediction of such a pixel as described above using previously processed neighbouring pixels can then hardly model such transitions.

There is therefore a need for a new coding and decoding method to improve the compression of image or video data.

3. SUMMARY OF THE INVENTION

The invention improves the state of the art. For this purpose, it relates to a method for decoding a coded data stream representative of at least one image that is split into blocks. Such a decoding method comprises, for at least one block of the image, referred to as the current block:
  determining a group of pixel values that are constant in the block from previously decoded pixels,
  for each pixel of the block:
    decoding a prediction residue associated with said pixel,
    determining a prediction value associated with the pixel according to a first prediction mode, according to which the pixel is predicted from at least one other previously decoded pixel, said other previously decoded pixel belonging to said current block or to a previously decoded block of the image,
    decoding from the data stream an item of information indicating whether the pixel is predicted according to a second prediction mode according to which the pixel is predicted using a prediction resulting from said group of pixel values that are constant in the block,
    when the item of information indicates that the pixel is predicted according to the second prediction mode:
      selecting a value of said group,
      replacing said prediction value associated with the pixel with said selected value,
    reconstructing said pixel using the prediction value associated with the pixel and the prediction residue.

Correlatively, the invention also relates to a method for coding a data stream representative of at least one image that is split into blocks. Such a coding method comprises, for at least one block of the image, referred to as the current block:
- determining a group of pixel values that are constant in the block from previously decoded pixels,
- for each pixel of the block:
  - determining a prediction value associated with the pixel according to a first prediction mode according to which the pixel is predicted by the prediction value associated with the pixel determined from at least one other previously decoded pixel, said other previously decoded pixel belonging to said current block or to a previously decoded block of the image,
  - determining a prediction mode for the pixel from the first prediction mode and a second prediction mode according to which the pixel is predicted using a prediction resulting from said group of pixel values that are constant in the block,
  - coding in the data stream, an item of information indicating whether the pixel is predicted according to the second prediction mode,
  - when the item of information indicates that the pixel is predicted according to the second prediction mode:
    - selecting a value of said group,
    - replacing said prediction value associated with the pixel with said selected value,
  - calculating a prediction residue associated with said pixel using the prediction value associated with the pixel and the value of said pixel,
  - coding the prediction residue associated with said pixel in the data stream,
  - reconstructing said pixel using the prediction value associated with the pixel and the decoded prediction residue.

The invention thus improves the compression performance of a coding mode using a local prediction by neighbouring pixels of a pixel to be coded. Advantageously, a group of pixel values representative of the values of neighbouring pixels of a block to be coded is determined. For example, this group comprises a predetermined number of pixel values that are the most frequent among the neighbouring pixels of the block to be coded. Typically, this group of values can comprise intensity values of the image layers when the image is represented in layers, for example for synthesis images, or comprising areas with a delimited foreground and background, such as black text on a white background.

According to a particular embodiment of the invention, the group of values comprises two values representative of the two most frequent values in the neighbourhood of the block.

When a pixel located in a transition area is detected, its prediction value is changed to one of the values of the group thus determined.

The values of such a group are said to be constant in the current block because they are determined only once for all the pixels of the current block.

According to a particular embodiment of the invention, a value of the group is selected according to a distance between the prediction value associated with said pixel and determined according to the first prediction mode in relation to the constant pixel values of the group.

This particular embodiment of the invention allows the convenient selection of a prediction value of the group for a pixel located in a transition area and does not require additional information to be transmitted to indicate this selection.

According to another particular embodiment of the invention, the group comprising a first value and a second value, when a distance between the prediction value associated with said pixel and the first value is less than a distance between the prediction value associated with said pixel and the second value, the selected value of said group is the first value, and the selected value of said group is the second value otherwise.

According to another particular embodiment of the invention, the item of information indicating whether the pixel is predicted according to the second prediction mode is decoded from the data stream or coded in the data stream only when the prediction residue of the pixel is different from 0.

This particular embodiment avoids coding the item of information indicating a prediction according to the second prediction mode when the prediction residue is different from 0. Thus, according to this particular embodiment, at the decoder, the first prediction mode is used by default to predict the current pixel.

This particular embodiment of the invention avoids unnecessary information to be coded by the encoder. Indeed, at the encoder, when the prediction according to the first prediction mode results in a zero prediction residue, i.e. an optimal prediction, the item of information indicating that the second prediction mode is not used for the current pixel is implicit.

Such a particular embodiment of the invention can be implemented at the encoder, by a prior step consisting in calculating the prediction residue from the prediction resulting from the first prediction mode or by a step consisting in determining whether or not the original value of the pixel to be coded is far from the prediction value resulting from the first prediction mode.

According to another particular embodiment of the invention, the determination of a group of pixel values that are constant in the block from previously decoded pixels is performed by calculating a histogram of the values of neighbouring pixels of the current block that have been previously reconstructed and selecting at least two pixel values representative respectively of two pixel values that are the most frequent among the neighbouring pixels of the current block.

According to another particular embodiment of the invention, a threshold value is determined from at least one value of said group of pixel values that are constant in the block from previously decoded pixels. When determining a prediction mode for the pixel, the second prediction mode is chosen:
- when the original value of said pixel is greater than said threshold value and the threshold value is greater than the prediction value associated with the pixel determined according to the first prediction mode, or
- when the original value of said pixel is less than said threshold value and the threshold value is less than the prediction value associated with the pixel determined according to the first prediction mode.

The invention also relates to a device for decoding a coded data stream representative of at least one image that is split into blocks. Such a decoding device comprises a processor configured, for at least one block of the image, referred to as the current block, to:
- determine a group of pixel values that are constant in the block from previously decoded pixels, for each pixel of the block:
  decode a prediction residue associated with said pixel,
  determine a prediction value associated with the pixel from at least one other previously decoded pixel, said other previously decoded pixel belonging to said current block or to a previously decoded block of the image,
  determine from the data stream an item of information indicating whether the pixel is predicted using a prediction resulting from said group of pixel values that are constant in the block,
  when the item of information indicates that the pixel is predicted using a prediction resulting from the group of pixel values that are constant in the block:
    select a value of said group,
    replace said prediction value associated with the pixel with said selected value,
  reconstruct said pixel using the prediction value associated with the pixel and the prediction residue.

According to a particular embodiment of the invention, such a decoding device is comprised in a terminal.

The invention also relates to a device for coding a data stream representative of at least one image that is split into blocks. Such a coding device comprises a processor configured, for at least one block of the image, referred to as the current block, to:
  determine a group of pixel values that are constant in the block from previously decoded pixels,
  for each pixel of the block:
    determine a prediction value associated with the pixel according to a first prediction mode, according to which the pixel is predicted from at least one other previously decoded pixel, said other previously decoded pixel belonging to said current block or to a previously decoded block of the image,
    determine a prediction mode for the pixel from the first prediction mode and a second prediction mode according to which the pixel is predicted using a prediction resulting from said group of pixel values that are constant in the block,
    code in the data stream an item of information indicating whether the pixel is predicted according to the second prediction mode,
    when the item of information indicates that the pixel is predicted according to the second prediction mode:
      select a value of said group,
      replace said prediction value associated with the pixel with said selected value,
    calculate a prediction residue associated with said pixel using the prediction value associated with the pixel and the value of said pixel,
    code the prediction residue associated with said pixel in the data stream,
    reconstruct said pixel using the prediction value associated with the pixel and the decoded prediction residue.

According to a particular embodiment of the invention, such a coding device is comprised in a terminal, or a server.

The invention also relates to a data stream representative of at least one image that is split into blocks. Such a data stream method comprises, for at least one block of the image, referred to as the current block, and for each pixel of the current block:
  an item of information representative of a prediction residue associated with said pixel,
  an item of information indicating whether the pixel is predicted using a prediction resulting from a group of pixel values that are constant in the block, the group of pixel values that are constant in the block being determined from previously decoded pixels.

The decoding method, respectively the coding method, according to the invention can be implemented in various ways, notably in wired form or in software form. According to a particular embodiment of the invention, the decoding method, respectively the coding method, is implemented by a computer program. The invention also relates to a computer program comprising instructions for implementing the decoding method or the coding method according to any one of the particular embodiments previously described, when said program is executed by a processor. Such a program can use any programming language. It can be downloaded from a communication network and/or recorded on a computer-readable medium.

This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means such as a memory. On the other hand, the recording media can correspond to a transmissible medium such as an electrical or optical signal, that can be carried via an electrical or optical cable, by radio or by other means. The program according to the invention can be downloaded in particular on an Internet-type network.

Alternatively, the recording media can correspond to an integrated circuit in which the program is embedded, the circuit being adapted to execute or to be used in the execution of the method in question.

4. LIST OF FIGURES

Other characteristics and advantages of the invention will emerge more clearly upon reading the following description of a particular embodiment, provided as a simple illustrative non-restrictive example, and the annexed drawings, wherein:

FIG. 2A illustrates an example of a portion of a coded data stream according to a particular embodiment of the invention.

FIG. 2B illustrates an example of a portion of a coded data stream according to another particular embodiment of the invention.

FIG. 3A illustrates a position example of the neighbouring blocks of a current block to determine an intra prediction mode according to a particular embodiment of the invention.

FIG. 3B illustrates a position example of the reference pixels used to predict pixels of a current block according to a particular embodiment of the invention.

FIG. 4 shows steps of the decoding method according to a particular embodiment of the invention.

5. DESCRIPTION OF AN EMBODIMENT OF THE INVENTION

5.1 General Principle

The invention improves a coding mode of a block of an image using a local prediction for pixels of the block located on a transition between two very distinct levels of pixel values.

A coding mode of a block to be coded using a local prediction allows the use of reference pixels belonging to the block to be coded to predict other pixels of the block to be coded. This prediction mode reduces the prediction residue by using pixels of the block that are spatially very close to the pixel to be coded.

However, this coding mode introduces a relatively large coding residue when the original pixels are far from their prediction. This is generally the case for content such as screenshots or synthesis images. In this type of content, a block to be coded can have strong discontinuities. In this case, reference pixels belonging to a background can be used to predict pixels of the same block belonging to a foreground, or vice versa. In this case, the item of information available in the reference pixels is not appropriate for an accurate prediction. The pixels located at the border between a background area and a foreground area are referred to as transition pixels hereafter.

Advantageously, the invention proposes to derive for a block to be coded an item of information relating to each layer of the image, for example, an item of information relating to the foreground and an item of information relating to the background, in the case where only two layers are considered. Additional layers of content can of course be taken into account, increasing the number of items of information to be derived. For example, the derivation of such information consists in determining a group of pixel values that are constant in the block.

According to a particular embodiment of the invention, this information relating to each layer of the image is derived from a local neighbourhood of the block to be coded.

Figure 5:
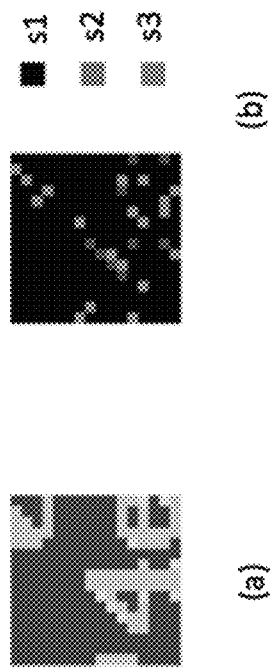
FIG. 5 illustrates examples of blocks comprising content such as screens each with two layers of content, and their respective neighbourhood in the image according to a particular embodiment of the invention.

Advantageously, this information is used in conjunction with a mechanism for detecting the transition pixels in the block to be coded. This reduces the residual energy of such pixels. FIG. 5 illustrates blocks (Bi-bl) comprising content such as screens each with two layers of content, and their respective neighbourhood (Neigh) in the image. As illustrated in FIG. 5, the local neighbourhood of a current block to be coded contains useful information relating to the intensity level of the two layers.

According to the invention, when transition pixels in the block to be coded are detected, the prediction value for these pixels is corrected using an intensity level of the layer corresponding to the one to which the pixel is likely to belong.

According to a particular embodiment of the invention, in order to have an optimal prediction for each pixel of the block and a limited rate cost, such a mechanism is limited to the pixels meeting certain conditions.

According to a local neighbourhood of a pixel to be predicted, three states of the pixel to be predicted can be defined:

s1: the pixel belongs to a homogeneous region in which the local prediction from the neighbouring pixels is very efficient, for example, it provides a zero quantized prediction residue. In this case, the pixel is not a transition pixel. According to an embodiment variant, this state can be implicitly detected at the decoder, s2: the pixel belongs to a region in which the local prediction from the neighbouring pixels is moderately efficient, for example, it provides a low prediction residue. The prediction of the pixel by the above-mentioned correction mechanism is allowed for this pixel, but the correction mechanism is not applied if the residual prediction error is not large enough compared to a threshold value determined according to the intensity levels of the layers. In this case, an indicator is specifically coded to indicate that the correction mechanism is not used, s3: the pixel belongs to a region in which the local prediction from the neighbouring pixels is not efficient, for example, it provides a large prediction residue. The prediction of the pixel by the above-mentioned correction mechanism is allowed for that pixel, and an indicator is specifically coded to indicate that use.

Figure 6:
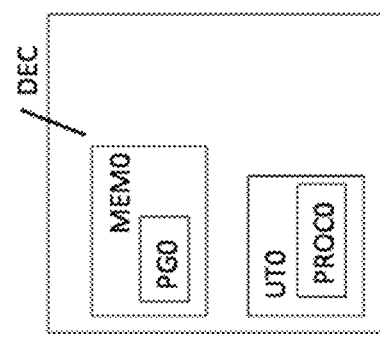
FIG. 6 illustrates an example of a 16×16 block comprising content such as screens with two layers of content and a transition map showing the transition states of the pixels for that block according to a particular embodiment of the invention.

FIG. 6 shows on the left an example of a 16×16 block with light text on a dark background and on the right a transition map for this block showing how the states described above can be assigned to the pixels of the block.

5. 2 Embodiments

Figure 1:
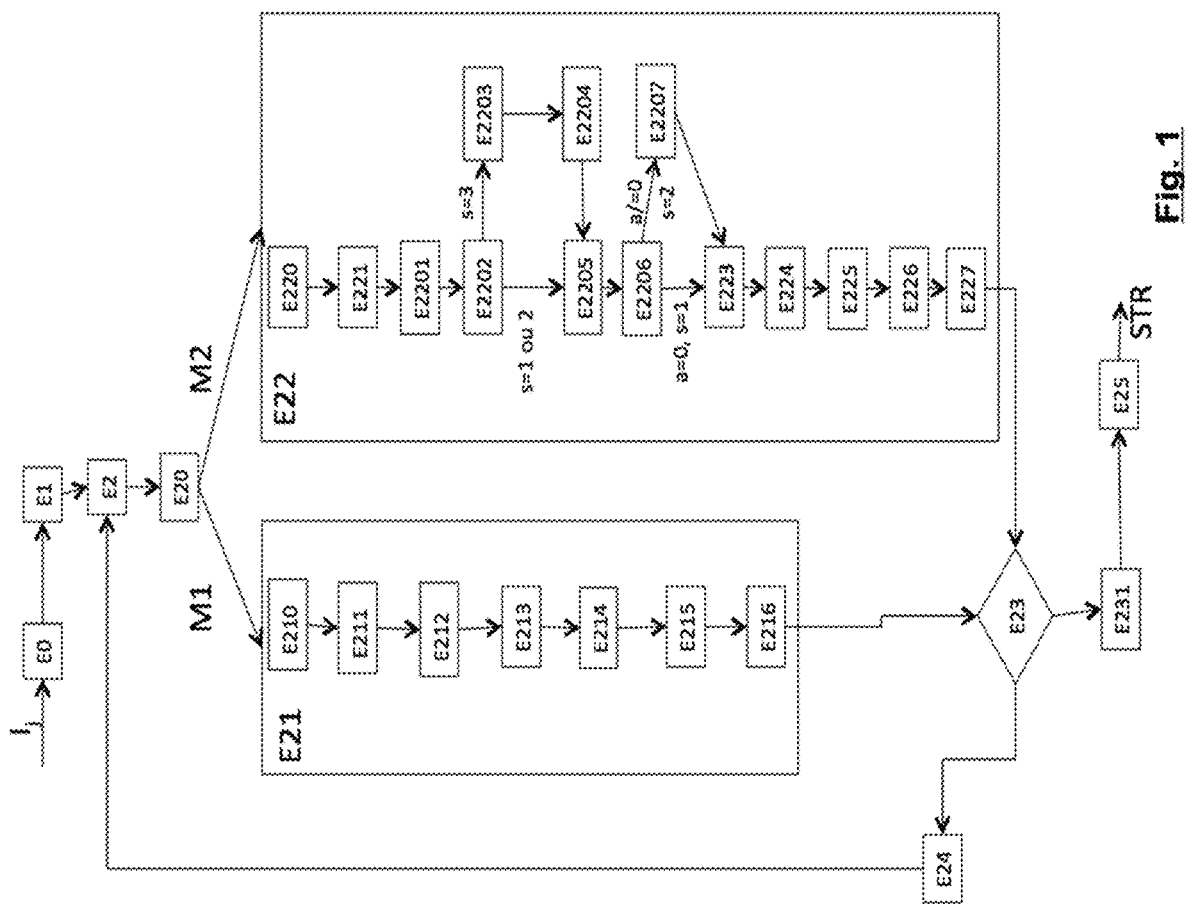
FIG. 1 shows steps of the coding method according to a particular embodiment of the invention.

FIG. 1 shows steps of the coding method according to a particular embodiment of the invention. For example, a sequence of images $I_1, I_2, \ldots, I_{Nb}$ is coded in the form of a coded data stream STR according to a particular embodiment of the invention. For example, such a coding method is implemented by a coding device as described later in relation to FIG. 7. A sequence of images $I_1, I_2, \ldots, I_{Nb}$, Nb being the number of images of the sequence to be coded, is provided as input of the coding method. The coding method outputs a coded data stream STR representative of the sequence of images provided as input.

In a known manner, the coding of the sequence of images $I_1, I_2, \ldots, I_{Nb}$ is done image by image according to a coding order previously established and known to the encoder. For example, the images can be coded in the temporal order $I_1, I_2, \ldots, I_{Nb}$ or in another order, for example $I_1, I_3, I_2, \ldots, I_{Nb}$.

In a step E0, an image $I_j$ to be coded of the sequence of images $I_1, I_2, \ldots, I_{Nb}$ is split into blocks, for example into blocks of size 32×32 or 64×64 pixels or more. Such a block can be subdivided into square or rectangular sub-blocks, for example 16×16, 8×8, 4×4, 16×8, 8×16 . . . . In a step E1, a first block or sub-block $X_b$ to be coded of the image $I_j$ is selected according to a predetermined scanning order of the image $I_j$. For example, it can be the first block in the lexicographical scanning order of the image.

In a step E2, the encoder chooses the coding mode to code the current block $X_b$.

According to the particular embodiment described here, the encoder selects the coding mode to code the current block $X_b$ from a first coding mode M1 and a second coding mode M2. Additional coding modes (not described here) can be used.

According to the particular embodiment described here, the first coding mode M1 corresponds to the conventional intra prediction coding of the current block, for example, as defined according to the HEVC standard, and the second coding mode M2 corresponds to an In-Loop Residual (ILR) or DPCM prediction coding described later.

The principle of the invention can be extended to other types of coding modes for the first coding mode M1. For example, the first coding mode can correspond to any type of coding modes using a transform of the prediction residue (inter-image prediction coding, spatial prediction with template matching coding, etc.).

In step E2, the encoder can perform a rate/distortion optimisation to determine the best coding mode to code the current block. During this rate/distortion optimisation, additional coding modes distinct from the first and the second coding modes can be tested, for example an inter mode coding mode. During this rate/distortion optimisation, the encoder simulates the coding of the current block $X_b$ according to the different available coding modes in order to determine the rate and the distortion associated with each coding mode and selects the coding mode offering the best rate/distortion compromise, for example according to the D+λ×R function, where R is the rate required to code the current block according to the evaluated coding mode, D is the distortion measured between the decoded block and the original current block, and λ is a Lagrangian multiplier, for example entered by the user or defined at the encoder.

In a step E20, an item of information indicating the coding mode selected for the current block is coded in the data stream STR.

If the current block $X_b$ is coded according to the first coding mode M1, the method proceeds to step E21 for coding the block according to M1. If the current block $X_b$ is coded according to the second coding mode M2, the method proceeds to step E22 for coding the block according to M2.

Step E21 for coding the block according to the first coding mode M1, according to a particular embodiment of the invention, is described below. According to the particular mode described here, the first coding mode corresponds to a conventional intra prediction, such as the one defined in the HEVC standard.

In a step E210, a quantization step $\delta_1$ is determined. For example, the quantization step $\delta_1$ can be set by the user, or calculated using a quantization parameter setting a compromise between compression and quality and entered by the user or defined by the encoder. Thus, such a quantization parameter can be the parameter λ, used in the rate-distortion cost function D+λ×R, where D represents the distortion introduced by the coding and R the rate used for coding. This function is used to make coding choices. Typically, a way of coding the image that minimises this function is sought.

As a variant, the quantization parameter can be QP, corresponding to the quantization parameter conventionally used in the AVC or HEVC standards. Thus, in the HEVC standard, the quantization step $\delta_1$ is determined by the equation $\delta_1$=levelScale[QP %6]<<(QP/6) where levelScale [k]={40, 45, 51, 57, 64, 72} for k=0 . . . 5.

In a step E211, a prediction of the current block is determined using a conventional intra prediction mode. According to this conventional intra prediction, each predicted pixel is calculated only from the decoded pixels originating from the neighbouring blocks (reference pixels) located above the current block, and to the left of the current block. The way the pixels are predicted from the reference pixels depends on a prediction mode that is transmitted to the decoder, and that is chosen by the encoder from a predetermined set of modes known to the encoder and the decoder.

Thus, in HEVC there are 35 possible prediction modes: 33 modes that interpolate the reference pixels in 33 different angular directions, and 2 other modes: the DC mode in which each pixel of the predicted block is produced from the average of the reference pixels, and the PLANAR mode, that performs a planar and non-directional interpolation. This "conventional intra prediction" is well known and also used in the ITU-T H.264 standard (where there are only 9 different modes) as well as in the experimental JEM software available at the Internet address (https://jvet.hhi.fraunhofer.de/), where there are 67 different prediction modes. In all cases, the conventional intra prediction respects the two aspects mentioned above (prediction of the pixels of the block to be coded from pixels of the neighbouring blocks and transmission to the decoder of an optimal prediction mode).

In step E211, the encoder thus chooses one of the available prediction modes from the predetermined list of prediction modes. One way to choose consists for example in evaluating all the prediction modes and keeping the prediction mode that minimises a cost function such as, classically, the rate-distortion cost.

In a step E212, the prediction mode chosen for the current block is coded from the neighbouring blocks of the current block. FIG. 3A illustrates a position example of the neighbouring blocks $A_b$ and $B_b$ of the current block $X_b$ to code the prediction mode of the current block $X_b$.

In step E212, the intra prediction mode chosen for the current block is coded using the intra prediction modes associated with the neighbouring blocks.

For example, the approach described in the HEVC standard for coding the prediction mode of the current block can be used. In the example in FIG. 3A, such an approach consists in identifying the intra prediction mode mA associated with the block $A_b$ located above the current block, and the intra prediction mode $m_B$ associated with the block $B_b$ located just to the left of the current block. Depending on the value of $m_A$ and $m_B$, a list called MPM (for Most Probable Mode), containing 3 intra prediction modes, and a list called non-MPM, containing the 32 other prediction modes, are created.

According to the HEVC standard, in order to code the intra prediction mode of the current block, syntax elements are transmitted:
a binary indicator indicating if the prediction mode to be coded for the current block is in the MPM list or not,
if the prediction mode of the current block belongs to the MPM list, an index in the MPM list corresponding to the prediction mode of the current block is coded,
if the prediction mode of the current block does not belong to the MPM list, an index in the non-MPM list corresponding to the prediction mode of the current block is coded.

In a step E213, the prediction residue R for the current block is constructed.

In step E213, in a standard manner, a predicted block P is constructed according to the prediction mode chosen in step E211. Then, the prediction residue R is obtained by calculating the difference for each pixel between the predicted block P and the original current block.

In a step E214, the prediction residue R is transformed into RT.

In step E214, a frequency transform is applied to the residue block R in order to produce the block $R_T$ comprising transform coefficients. The transform could be a DCT-type transform for example. It is possible to choose the transform to be used from a predetermined set of transforms $E_T$ and to inform the decoder of the transform used.

In a step E215, the transformed residue block $R_T$ is quantized using for example a quantization step scalar quantization$\delta_1$. This produces the quantized transformed prediction residue block $R_{TQ}$.

In a step E216, the coefficients of the quantized block $R_{TQ}$ are coded by an entropy encoder. For example, the entropy coding specified in the HEVC standard can be used.

In a known manner, the current block is decoded by dequantizing the coefficients of the quantized block $R_{TQ}$, then applying the inverse transform to the dequantized coefficients to obtain the decoded prediction residue. The prediction is then added to the decoded prediction residue in order to reconstruct the current block and obtain its decoded version. The decoded version of the current block can then be used later to spatially predict other neighbouring blocks of the image or to predict blocks of other images by inter-image prediction.

Step E22 for coding the block according to the second coding mode M2, according to a particular embodiment of the invention, is described below. According to the particular embodiment described here, the second coding mode corresponds to an ILR prediction coding.

In a prior step E220, a quantization step $\delta_2$ is determined. For example, the quantization step $\delta_2$ depends on the same quantization parameter as the quantization step $\delta_1$ that would be determined in step E210 if the current block was coded according to the first coding mode.

According to the invention, in this coding mode, the pixels of the current block can be predicted according to a first prediction mode or a second prediction mode.

According to the first prediction mode, a pixel of the current block is predicted by previously reconstructed pixels of a neighbouring block of the current block and/or previously processed pixels of the current block itself. Preferably, to predict a pixel, pixels that are as close as possible to the pixel to be predicted are chosen. This is why it is referred to a local predictor. According to the second prediction mode, a pixel of the current block is predicted by a level value of layers selected by a group of values determined, for example, from the neighbourhood of the current block.

In a step E221, a group of pixel values that are constant in the block is determined from previously decoded pixels. Several reconstruction levels of the current block are determined, for example two, called f and b. These levels are constructed by analysing values taken by the reference pixels of the current block, i.e. the pixels from previously processed blocks neighbouring the current block. There are several techniques for determining the levels f and b. Thus, it is possible to calculate the histogram of the values of the reference pixels and to assign b the most frequent value and f the second most frequent value. Another approach consists in identifying the local maxima of the histogram, i.e. the largest values surrounded by smaller values. The level f is then assigned the largest local maximum and the level b the second largest local maximum.

Furthermore, according to a particular embodiment of the invention, a threshold value thr is determined, which is typically halfway between f and b and defined as thr=(f+b)/2. In an alternative embodiment, thr=dyn/2 can also be chosen, where dyn is the maximum value of the signal.

The embodiment variants described above for determining the group of pixel values that are constant in the block allow an implicit detection of the image layers which can also be implemented at the decoder, without the need to transmit additional information.

For example, in order to limit the complexity of the detection of the image layers, the direct neighbourhood of the current block is used: for example, only the pixels of the column on the left, and of the line above the current block, are used.

According to other variants, more than two values can be determined, by considering the following local maxima of the histogram, for example.

The values f and b thus determined correspond to the values of the group of values used for the second prediction mode.

The following steps are carried out for each pixel of the current block.

In a step E2201, a local predictor PL for the pixel considered is determined. This local predictor PL corresponds to the predictor obtained according to the first prediction mode. The local predictor PL can be determined as follows. If we call X a current pixel to be predicted of the current block, A the pixel located immediately to the left of X, B the pixel located immediately to the left of and above X, C the pixel located immediately above X, as illustrated in FIG. 3B showing a current block $X_b$. The local predictor PL is defined by:

$$PL(X) = \min(A, B) \text{ if } C \geq \max(A, B)$$
$$\max(A, B) \text{ if } C \leq \min(A, B)$$
$$A + B - C \text{ otherwise}$$

where min(A,B) corresponds to the function returning the smallest value between the value of A and the value of B and max(A,B) corresponds to the function returning the largest value between the value of A and the value of B.

Other local prediction functions can be used. According to another variant, several local prediction functions can be available and the same local prediction function is selected for all the pixels of the current block. For example, an orientation of the texture of the pixels of previously coded neighbouring blocks is analysed. For example, the previously coded pixels in a neighbouring block that are located above or to the left of the current block are analysed using a Sobel-type operator. If it is determined that:

if no orientation emerges, the prediction function is the one defined above, if the orientation is horizontal, the prediction function is PL(X)=A, if the orientation is vertical, the prediction function is PL(X)=B, if the orientation is diagonal, the prediction function is PL(X)=C.

The prediction value PL(X) associated with the current pixel X of the current block is thus obtained according to the location of the pixel in the current block using either pixels outside the block that are already reconstructed (and thus available with their decoded value), or pixels previously reconstructed in the current block, or both. In all cases, the predictor PL uses previously reconstructed pixels. In FIG. 3B, it can be seen that the pixels of the current block located on the first row and/or the first column of the current block will use as reference pixels (to construct the prediction value PL(X)) pixels outside the block that are already reconstructed (pixels in grey in FIG. 3B) and possibly already reconstructed pixels of the current block. For the other pixels of the current block, the reference pixels used to construct the prediction value PL(X) are located inside the current block.

In a step E2202, the prediction mode is determined from the first prediction mode and the second prediction mode to be used to predict the current pixel.

According to a particular embodiment of the invention, the second prediction mode is chosen when PL(X)<thr<X or when PL(X)>thr>X. In other words, the second prediction mode is chosen:
  when the original value X of the pixel is greater than the threshold value thr and the threshold value thr is greater than the prediction value PL(X) associated with the pixel determined according to the first prediction mode, or
  when the original value X of the pixel is less than the threshold value thr and the threshold value thr is less than the prediction value PL(X) associated with the pixel determined according to the first prediction mode.

If one of the above conditions is met, then the state of the pixel to be predicted is s=3 and the encoder proceeds to the next step E2203.

In step E2203, an indicator t indicating that the pixel to be predicted is predicted according to the second prediction mode is set to 1, for example, and encoded in the data stream STR, for example, by entropy encoding, or transmitted as is in the stream.

In a step E2204, a value of the group of values determined in step E221 is selected to predict the current pixel.

According to a particular embodiment of the invention, a value of the group is selected according to the distance between the prediction value associated with said pixel determined according to the first prediction mode in relation to the group pixel values determined in step E221. For example, when the distance between the prediction value PL(X) associated with said pixel according to the first prediction mode and the value b of the group is less than the distance between the prediction value PL(X) associated with said pixel according to the first prediction mode and the value f, the selected value is b, and the selected value is f otherwise.

The L1 or L2 standard can be used, for example, as a distance measurement.

Thus, if |PL(X)−b|<|PL(X)−f|, then PL(X)=b, otherwise PL(X)=f.

The method then proceeds to step E2205.

If in step E2202, it is determined that the current pixel is not predicted according to the second prediction mode, the current pixel is then predicted according to the first prediction mode. The prediction value PL(X) associated with the current pixel and obtained according to the first prediction mode is then not modified. The current pixel is then in the state s=1 or s=2.

In a step E2205, a prediction residue R1(X) is calculated for the current pixel as the difference between the original value X of the current pixel and the prediction value PL(X) associated with the current pixel, i.e. R1(X)=X−PL(X). Here, the prediction value PL(X) may have been obtained either by the first prediction mode or by the second prediction mode. The prediction residue R1(X) is then quantized in Q(X), by a quantization step scalar quantizer $\delta_2$, by Q(X)=ScalarQuant(R1(X))=ScalarQuant($\delta_2$, X−PL(X)), the scalar quantize being for example a nearest-neighbour scalar quantizer such as:

$$ScalarQuant(\Delta, x) = \text{floor}\left(\frac{x + \frac{\Delta}{2}}{\Delta}\right)$$

where $\Delta$ is the quantization step and x the value to be quantized.

Q(X) is the quantized residue associated with X. It is calculated in the spatial domain, i.e. calculated directly from the difference between the prediction value PL(X) of the pixel X and the original value of X. Such a quantized residue Q(X) for the pixel X is stored in a quantized prediction residue block R1$_Q$, that will be coded later.

In a step E2206, the decoded predicted value P1(X) of X is calculated by adding the dequantized value of the quantized residue Q(X) to the prediction value PL(X). The decoded predicted value P1(X) of X is thus obtained by P1(X)=PL(X)+ScalarDequant($\delta_2$, Q (X)). For example, the nearest scalar quantization inverse function is given by: ScalarDequant($\Delta$, x)=$\Delta \times$x.

The decoded predicted value P1(X) thus makes it possible to predict possible pixels that remain to be processed in the current block.

Furthermore, the block P1 comprising the decoded/reconstructed values P1(X) of the pixels of the current block can be defined. Such a block P1 is the ILR predictor of the current block (as opposed to the conventional intra predictor).

According to a particular embodiment of the invention, in a step E2207, when the quantized prediction residue Q1(X) is not zero, in other words when the amplitude a of the quantized prediction residue Q1(X) is not zero, the indicator t is set to 0, for example, and coded in the data stream STR. In this case, the current pixel is considered to be in the state s=2.

According to this particular embodiment of the invention, when the quantized prediction residue Q1(X) is zero, i.e. the amplitude a of the quantized prediction residue Q1(X) is zero, the indicator t is also set to 0 since the current pixel is not predicted by the second prediction mode, but the indicator t is not coded in the data stream STR. This prediction mode will be deduced implicitly at the decoder from the decoded value of the amplitude of the quantized prediction residue Q1(X). In this case, the current pixel is considered to be in the state s=1. In this case, the method proceeds from step E2206 to step E223 directly.

Of course, in practice, when it is explicitly coded (s=2 or s=3), the indicator t is coded in the data stream after the quantized prediction residue Q1(X) is coded.

According to another particular embodiment of the invention, the indicator t is set to 0, and systematically coded in step E2207 for each pixel, in the data stream STR, regardless of the value of the amplitude a of the prediction residue Q1(X). Thus, at the decoder, it is explicitly determined by the decoder whether or not the current pixel is predicted according to the second prediction mode, by reading the indicator t, regardless of the value of the quantized prediction residue. In this case, it is not differentiated whether the pixel is in the state s=1 or s=2.

According to a variant, in this particular embodiment of the invention, since the indicator t is systematically coded, in step E2202, the determination of the prediction mode from the first prediction mode and the second prediction mode to be used to predict the current pixel can for example be done by comparing a distance measurement between the prediction value provided by the first prediction mode and the original value X of the current pixel and a distance measurement between the prediction value provided by the second prediction mode and the original value X of the current pixel.

The steps described above are performed for all the pixels of the current block, in a scanning order that ensures that the pixels used for the local prediction are available.

According to an embodiment variant, the scanning order of the current block is the lexicographical order, i.e. from left to right, and from top to bottom.

According to another embodiment variant, several scanning orders of the current block can be used, for example:
the lexicographical order, or
scanning the first column from top to bottom, then the column just to the right of it, etc., or
scanning the diagonals one after the other.

According to this other variant, it is possible to simulate the coding cost associated with each of the scanning orders and to choose the best scanning order for the current block in terms of rate/distortion, then to code for the current block an item of information representative of the chosen scanning order.

At the end of step E2205, the quantized residue block $R1_Q$ was determined. This quantized residue block $R1_Q$ must be coded for transmission to the decoder. The predictor P1 of the current block was also determined.

In a step E223, the quantized residue block $R1_Q$ is coded for transmission to the decoder. Any known approach such as the method described in HEVC can be used to code the quantized coefficients of a conventional prediction residue.

In a standard manner, each quantized prediction residue Q1(X) of the current block is broken down into an amplitude value a and a sign indicator sgn when the amplitude a is distinct from 0.

According to the particular embodiment of the invention described here, the amplitude and sign values of the quantized residue block $R1_Q$ are coded using an entropy encoder in the data stream STR.

According to a particular embodiment of the invention, it is possible to determine and code an additional prediction residue R2 from the ILR predictor obtained for the current block. The coding of an additional prediction residue R2 is, however, optional. It is indeed possible to simply code the current block by its predicted version P1 and the quantized residue $R1_Q$. In order to code an additional prediction residue R2 for the current block, the following steps are implemented.

In a step E224, the difference R2 between the predictor P1 and the original current block $X_b$ is calculated to form an additional residue R2: $R2=X_b-P1$. The following steps correspond to the conventional coding steps for this residue R2.

In a step E225, the residue R2 is transformed using a frequency transform in order to produce the block of coefficients $R2_T$.

The transform can be a DCT-type transform for example. It is possible to choose the transform to be used from a predetermined set of transforms $E_{T2}$ and to inform the decoder of the transform used. In this case, the set $E_{T2}$ can be different from the set $E_T$, in order to adapt to the particular statistics of the residue R2.

In a step E226, the block of coefficients $R2_T$ is quantized, for example using a quantization step scalar quantization δ. This produces the block $R2_{TQ}$.

The quantization step δ can be set by the user. It can also be calculated using the parameter λ setting the compromise between compression and quality and entered by the user or the encoder. For example, the quantization step δ can correspond to the quantization step $δ_1$ or be determined similarly to it.

In a step E227, the coefficients of the quantized block $R2_{TQ}$ are then transmitted in a coded manner. For example, the coding specified in the HEVC standard can be used.

In a known manner, the current block is decoded by dequantizing the coefficients of the quantized block $R2_{TQ}$, then applying the inverse transform to the dequantized coefficients to obtain the decoded prediction residue. The prediction P1 is then added to the decoded prediction residue in order to reconstruct the current block and obtain its decoded version $X_{rec}$. The decoded version $X_{rec}$ of the current block can then be used later to spatially predict other neighbouring blocks of the image or to predict blocks of other images by inter-image prediction.

In a step E23, it is checked if the current block is the last block of the image to be processed by the coding method, taking into account the previously defined scanning order. If the current block is not the last block of the image to be processed, in a step E24, the subsequent block of the image to be processed is selected according to the previously defined scanning order of the image and the coding method proceeds to step E2, where the selected block becomes the current block to be processed.

If all the blocks of the image have been coded, the method proceeds to the application of the post-processing methods to be applied to the reconstructed image in a step E231. For example, such post-processing methods can be a deblocking filtering and/or an SAO (Sample Adaptive Offset) method as defined in the HEVC standard.

The method proceeds to coding (step E25) the next image of the video, if any.

FIGS. 2A and 2B schematically illustrate a portion of a data stream resulting from the coding as described above according to different particular embodiments of the invention. FIG. 2A illustrates an example of a stream for three pixels (X1, X2, X3) of a block of the image coded according to a particular embodiment of the invention, wherein it has been determined that the pixel X1 is considered to be in the state s=3, the pixel X2 is considered to be in the state s=2 and the pixel X3 is considered to be in the state s=1.

It can be seen that according to the variant described here, the data coded for the pixel X1 is the amplitude value of the quantized prediction residue a(X1), its sign sgn(X1) and the value of the indicator t set to 1. The data coded for the pixel X2 is the amplitude value of the quantized prediction residue a(X2), its sign sgn(X2) and the value of the indicator t. For X2, the amplitude value of the quantized prediction residue being distinct from 0, the indicator t set to 0 is explicitly coded in the stream.

The data coded for the pixel X3 is the amplitude value of the quantized prediction residue a(X3) that is zero. In this case, the amplitude value of the quantized prediction residue is distinct from 0, so the indicator t set to 0 is not explicitly coded in the stream and will be implicitly deduced at the decoder.

FIG. 2B illustrates an example of a stream for three pixels (X1, X2, X3) of a block of the image coded according to another particular embodiment of the invention, wherein it has been determined that the pixel X1 is considered to be in the state s=3, the pixel X2 is considered to be in the state s=2 and the pixel X3 is considered to be in the state s=1.

It can be seen that according to the variant described here, the data coded for the pixel X1 is the amplitude value of the quantized prediction residue a(X1), its sign sgn(X1) and the value of the indicator t set to 1. The data coded for the pixel X2 is the amplitude value of the quantized prediction residue a(X2), its sign sgn(X2) and the value of the indicator t set to 0. The data coded for the pixel X3 is the amplitude value of the quantized prediction residue a(X3) that is zero and the indicator t set to 0.

FIG. 4 shows steps of the method for decoding a stream STR of coded data representative of a sequence of images $I_1$, $I_2$, . . . , $I_{Nb}$ to be decoded according to a particular embodiment of the invention.

For example, the data stream STR was generated via the coding method shown in relation to FIG. 1. The data stream STR is provided as input to a decoding device DEC, as described in relation to FIG. 8.

The decoding method decodes the stream image by image and each image is decoded block by block.

In a step E40, an image $I_j$ to be decoded is subdivided into blocks. Each block will undergo a decoding operation consisting in a series of steps that are detailed hereafter. Blocks can be the same size or different sizes.

In a step E41, a first block or sub-block $X_b$ to be decoded of the image $I_j$ is selected as the current block according to a predetermined scanning order of the image $I_j$. For example, it can be the first block in the lexicographical scanning order of the image.

In a step E42, an item of information indicating a coding mode for the current block is read from the data stream STR. According to the particular embodiment described here, this item of information indicates if the current block is coded according to a first coding mode M1 or according to a second coding mode M2. According to the particular embodiment described here, the first coding mode M1 corresponds to the conventional intra prediction coding of the current block, for example as defined according to the HEVC standard, and the second coding mode M2 corresponds to the In-Loop Residual (ILR) prediction coding.

In other particular embodiments, the item of information read from the stream STR can also indicate the use of other coding modes to code the current block (not described here). The step E43 for decoding the current block when the current block is coded according to the first coding mode M1 is described below.

In a step E430, a quantization step $\delta_1$ is determined. For example, the quantization step $\delta_1$ is determined from a quantization parameter QP transmitted in the data stream STR or similarly to what was done at the encoder. For example, the quantization parameter QP can be the quantization parameter conventionally used in the AVC or HEVC standards. Thus, in the HEVC standard, the quantization step $\delta_1$ is determined by the equation $\delta_1$=levelScale[QP %6]<< (QP/6), where levelScale[k]={40, 45, 51, 57, 64, 72} for k=0 . . . 5.

In a step E431, the prediction mode chosen to code the current block is decoded from the neighbouring blocks. For this purpose, as it was done at the encoder, the intra prediction mode chosen for the current block is coded using the intra prediction modes associated with the neighbouring blocks of the current block.

The construction of both MPM and non-MPM lists is strictly similar to what was done during coding. According to the HEVC standard, syntax elements of the following type are decoded:
 a binary indicator indicating if the prediction mode to be coded for the current block is in the MPM list or not,
 if the prediction mode of the current block belongs to the MPM list, an index in the MPM list corresponding to the prediction mode of the current block is read,
 if the prediction mode of the current block does not belong to the MPM list, an index in the non-MPM list corresponding to the prediction mode of the current block is read.

The binary indicator and the prediction mode index are thus read for the current block from the data stream STR, to decode the intra prediction mode of the current block.

In a step E432, the decoder constructs a predicted block P for the current block from the decoded prediction mode.

In a step E433, the decoder decodes the coefficients of the quantized block $R_{TQ}$ from the data stream STR, for example using the decoding specified in the HEVC standard.

In a step E434, the decoded block $R_{TQ}$ is dequantized, for example using a quantization step scalar dequantization $\delta_1$. This produces the block of dequantized coefficients $R_{TQD}$.

In a step E435, an inverse frequency transform is applied to the block of dequantized coefficients $R_{TQD}$ in order to produce the decoded prediction residue block $R_{TQDI}$. The transform could be an inverse DCT-type transform for example. It is possible to choose the transform to be used from a predetermined set of transforms $E_{TT}$ by decoding an indicator from the data stream STR.

In a step E436, the current block is reconstructed from the predicted block P obtained in step E432 and the decoded residue block $R_{TQDI}$ obtained in step E435, in order to produce the decoded current block $X_{rec}$, by $X_{rec}$=P+$R_{TQDI}$.

The step E44 for decoding the current block when the current block is coded according to the second coding mode M2 is described below.

In a step E440, the quantization step $\delta_2$ is determined, similarly to what was done at the encoder.

According to the invention, in this coding mode M2, the pixels of the current block can be predicted according to the first prediction mode or the second prediction mode already presented in relation to FIG. 1.

In a step E441, the group of pixel values that are constant in the block is determined from previously decoded pixels of the image, similarly to what was done at the encoder. It is considered as with the encoder that the level values f and b have been determined.

The following steps are carried out for each pixel of the current block.

In a step E4411, the prediction value of the current pixel according to the first prediction mode is determined. For this purpose, the same local predictor PL as at the encoder is used. When several local predictors are possible, the local predictor PL is determined similarly to what was done at the encoder.

In a step E442, the quantized residue $R1_Q$ is decoded from the data stream STR. Any known approach such as the method described in HEVC can be used to decode the quantized coefficients of the conventional prediction residue. The amplitude a of the quantized prediction residual Q1'(X) for the current pixel is then obtained.

According to a particular embodiment of the invention, in a step E4421, when the amplitude a of the quantized prediction residue Q1'(X) is zero, an indicator t indicating whether the current pixel is predicted according to the second prediction mode is implicitly set to 0. In this case, the current pixel is considered to be in the state s=1, and it will be predicted by the prediction value resulting from the first prediction mode. The quantized prediction residue Q1'(X) is then reconstructed by Q1'(X)=0.

Otherwise, when the amplitude a of the quantized prediction residue Q1'(X) is not zero, the sign sgn associated with the quantized prediction residue Q1'(X) is read in the data stream STR. The quantized prediction residue Q1'(X) is then reconstructed by Q1'(X)=a×sgn.

Then, in a step E4422, the indicator t for the current pixel is read in the data stream STR. If the value of the indicator t read is 0, the state of the current pixel is s=2. If the value of the indicator t read is 1, the state of the current pixel is s=3.

According to another particular embodiment of the invention, the indicator t is systematically coded for each pixel of the current block. In this case, in step E4422, the value 0 or 1 of the indicator t is read in the data stream STR and the state of the pixel s is set accordingly.

When the state of the current pixel is s=3, the current pixel is predicted according to the second prediction mode. In this case, in a step E4423, a value of the group of values determined in step E441 is selected and assigned to the prediction value PL(X) associated with the current pixel to predict the current pixel similarly to what was done at the encoder. For example, if |PL(X)−b|<|PL(X)−f|, then PL(X)=b, otherwise PL(X)=f. The method then proceeds to step E443.

When the state of the current pixel is s=2 or s=1, the current pixel is predicted according to the first prediction mode. In this case, the prediction value PL(X) of the current pixel determined according to the first prediction mode in step E4411 is not changed.

In a step E443, the quantized residue Q1'(X) is dequantized using the quantization step $\delta_2$, in order to produce the dequantized residue QD1(X).

In a step E444, the reconstructed value of the current pixel X' is obtained using the prediction value PL(X) determined in step E4411 or E4423 and the dequantized prediction residue QD1(X): X'=PL(X)+QD1(X).

The prediction residues Q1(X) of the pixels of the current block are placed in a prediction residue block $R1_Q$, the dequantized prediction residues QD1(X) of the pixels of the current block are placed in a dequantized prediction residue block $R1_{QD}$, the reconstructed values X' of the pixels of the current block are placed in a reconstructed block P1.

The above steps are implemented for all the pixels of the current block, in a scanning order that ensures that the pixels used for the local prediction are available.

For example, the scanning order is the lexicographical order (from left to right, then rows from top to bottom).

According to a particular embodiment of the invention, the block P1 comprising the reconstructed values PL(X)+QD1(X) of each pixel of the current block forms here the decoded current block $X_{rec}$.

According to another particular embodiment of the invention, it is considered that an additional prediction residue was coded for the current block. It is therefore necessary to decode this additional prediction residue in order to reconstruct the decoded version of the current block $X_{rec}$.

For example, this other particular embodiment can be activated or not by default at the encoder and decoder level. Or, an indicator can be coded in the data stream with the block level information to indicate for each block coded according to the ILR coding mode if an additional prediction residue is coded. Or further, an indicator can be coded in the data stream with the image or sequence of images level information to indicate for all the blocks of the image or of the sequence of images coded according to the ILR coding mode if an additional prediction residue is coded.

When an additional prediction residue is coded for the current block, in a step E445, the coefficients of the quantized prediction residue $R2_{TQ}$ are decoded from the data stream STR, using means adapted to those implemented at the encoder, for example the means implemented in an HEVC decoder.

In a step E446, the block of quantized coefficients $R2_{TQ}$ is dequantized, for example using a quantization step scalar dequantization $\delta_1$. This produces the block of dequantized coefficients $R2_{TQD}$.

In a step E447, an inverse frequency transform is applied to the block $R2_{TQD}$ in order to produce the decoded prediction residue block $R2_{TQDi}$.

The inverse transform could be an inverse DCT-type transform for example.

It is possible to choose the transform to be used from a predetermined set of transforms $E_{T2}$ and to decode the item of information informing the decoder of the transform to be used. In this case, the set $E_{T2}$ is different from the set $E_T$, in order to adapt to the particular statistics of the residue R2.

In a step E448, the current block is reconstructed by adding the predicted block P1 obtained in step E444 to the decoded prediction residue $R2_{TQDi}$.

In a step E45, it is checked if the current block is the last block of the image to be processed by the decoding method, taking into account the previously defined scanning order. If the current block is not the last block of the image to be processed, in a step E46, the subsequent block of the image to be processed is selected according to the previously defined scanning order of the image and the decoding method proceeds to step E42, the selected block becoming the current block to be processed.

If all the blocks of the image have been coded, the method proceeds to the application of the post-processing methods to be applied to the reconstructed image in a step E451 if required. Such post-processing methods can be a deblocking filtering and/or an SAO method. The method then proceeds to decoding (step E47) the next image of the video, if any.

Figure 7:
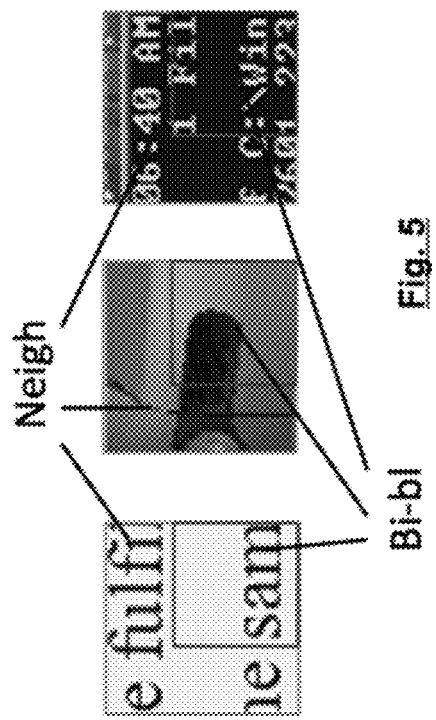
FIG. 7 shows the simplified structure of a coding device adapted to implement the coding method according to any one of the particular embodiments of the invention.

FIG. 7 shows the simplified structure of a coding device COD adapted to implement the coding method according to any one of the particular embodiments of the invention.

According to a particular embodiment of the invention, the steps of the coding method are implemented by computer program instructions. For this purpose, the coding device COD has the standard architecture of a computer and notably comprises a memory MEM, a processing unit UT, equipped for example with a processor PROC, and driven by the computer program PG stored in the memory MEM. The computer program PG comprises instructions for implementing the steps of the coding method as described above, when the program is executed by the processor PROC.

At initialisation, the code instructions of the computer program PG are for example loaded into a RAM memory (not shown) before being executed by the processor PROC. In particular, the processor PROC of the processing unit UT implements the steps of the coding method described above, according to the instructions of the computer program PG.

Figure 8:
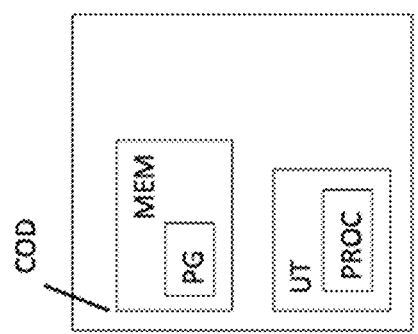
FIG. 8 shows the simplified structure of a decoding device adapted to implement the decoding method according to any one of the particular embodiments of the invention.

FIG. 8 shows the simplified structure of a decoding device DEC adapted to implement the decoding method according to any one of the particular embodiments of the invention. According to a particular embodiment of the invention, the decoding device DEC has the standard architecture of a computer and notably comprises a memory MEMO, a processing unit UT0, equipped for example with a processor PROC0, and driven by the computer program PG0 stored in the memory MEMO. The computer program PG0 comprises instructions for implementing the steps of the decoding method as described above, when the program is executed by the processor PROC0.

At initialisation, the code instructions of the computer program PG0 are for example loaded into a RAM memory (not shown) before being executed by the processor PROC0. In particular, the processor PROC0 of the processing unit UT0 implements the steps of the decoding method described above, according to the instructions of the computer program PG0.

The invention claimed is:

1. A method for decoding a coded data stream representative of at least one image, said image being split into blocks, the decoding method being implemented by a decoding device and comprising, for at least one block of the image, referred to as a current block:
   determining a group of pixel values in the block from previously decoded pixels, and for each pixel of the block:
   (i) decoding a prediction residue associated with said pixel,
   (ii) determining a prediction value associated with the pixel according to a first prediction mode, according to which the pixel is predicted from at least one other previously decoded pixel, said other previously decoded pixel belonging to said current block,
   (iii) decoding from the data stream an item of information indicating whether the pixel is predicted according to a second prediction mode according to which the pixel is predicted using a prediction resulting from said group of pixel values in the block,
   (iv) in response to the item of information indicating that the pixel is predicted according to the second prediction mode:
      (a) selecting a value of said group according to a distance between the prediction value associated with said pixel compared to the pixel values of the group, and
      (b) replacing said prediction value associated with the pixel with said selected value, and
   (v) reconstructing said pixel using the prediction value associated with the pixel and the prediction residue.

2. The method according to claim 1, wherein the group comprising a first value and a second value, when a distance between the prediction value associated with said pixel and the first value is less than a distance between the prediction value associated with said pixel and the second value, the selected value of said group is the first value, and the selected value of said group is the second value otherwise.

3. The method according to claim 1, wherein the decoding from the data stream of the item of information indicating whether the pixel is predicted according to the second prediction mode is performed only when the prediction residue is different from 0.

4. The method according to claim 1, wherein the determination of a group of pixel values in the block from previously decoded pixels is performed by calculating a histogram of the values of neighbouring pixels of the current block that were previously reconstructed and the selection at least two pixel values representative respectively of two pixel values that are the most frequent among the neighbouring pixels of the current block.

5. A method for coding a data stream representative of at least one image, said image being split into blocks, the coding method being implemented by a coding device and comprising, for at least one block of the image, referred to as a current block:
   determining a group of pixel values in the block from previously decoded pixels, and for each pixel of the block:
   (i) determining a prediction value associated with the pixel according to a first prediction mode, according to which the pixel is predicted from at least one other previously decoded pixel, said other previously decoded pixel belonging to said current block,
   (ii) determining a prediction mode for the pixel from the first prediction mode and a second prediction mode according to which the pixel is predicted using a prediction resulting from said group of pixel values in the block,
   (iii) coding in the data stream an item of information indicating whether the pixel is predicted according to the second prediction mode,
   (iv) in response to the item of information indicating that the pixel is predicted according to the second prediction mode:
      (a) selecting a value of said group according to a distance between the prediction value associated with said pixel compared to the pixel values of the group, and
      (b) replacing said prediction value associated with the pixel with said selected value,
   (v) calculating a quantized prediction residue associated with said pixel using the prediction value associated with the pixel and the value of said pixel,
   (vi) reconstructing said pixel using the prediction value associated with the pixel and the decoded prediction residue, and
   (vii) coding the quantized prediction residue associated with said pixel in the data stream.

6. The method according to claim 5, wherein a threshold value is determined from at least one value of said group of pixel values in the block from previously decoded pixels, when determining a prediction mode for the pixel, the second prediction mode is chosen:
   when the original value of said pixel is greater than said threshold value and the threshold value is greater than the prediction value associated with the pixel determined according to the first prediction mode, or
   when the original value of said pixel is less than said threshold value and the threshold value is less than the prediction value associated with the pixel determined according to the first prediction mode.

7. The method according to claim 5, wherein the group comprising a first value and a second value, when a distance between the prediction value associated with said pixel and the first value is less than a distance between the prediction value associated with said pixel and the second value, the selected value of said group is the first value, and the selected value of said group is the second value otherwise.

8. The method according to claim 5, wherein the coding in the data stream of the item of information indicating whether the pixel is predicted according to the second prediction mode is performed only when the prediction residue is different from 0.

9. The method according to claim 5, wherein the determination of a group of pixel values in the block from previously decoded pixels is performed by calculating a histogram of the values of neighbouring pixels of the current block that were previously reconstructed and the selection at least two pixel values representative respectively of two pixel values that are the most frequent among the neighbouring pixels of the current block.

10. A device for decoding a coded data stream representative of at least one image, said image being split into blocks, wherein the decoding device comprises:

a processor configured, for at least one block of the image, referred to as a current block, to:

determine a group of pixel values in the block from previously decoded pixels, and for each pixel of the block:
(i) decode a prediction residue associated with said pixel,
(ii) determine a prediction value associated with the pixel from at least one other previously decoded pixel, said other previously decoded pixel belonging to said current block,
(iii) determine from the data stream an item of information indicating whether the pixel is predicted using a prediction resulting from said group of pixel values in the block,
(iv) in response to the item of information indicating that the pixel is predicted using a prediction resulting from the group of pixel values in the block:
 (a) select a value of said group according to a distance between the prediction value associated with said pixel compared to the pixel values of the group, and
 (b) replace said prediction value associated with the pixel with said selected value, and
(v) reconstruct said pixel using the prediction value associated with the pixel and the prediction residue.

11. A device for coding a data stream representative of at least one image, said image being split into blocks, wherein the coding device comprises:

a processor configured, for at least one block of the image, referred to as a current block, to:

determine a group of pixel values in the block from previously decoded pixels, and for each pixel of the block:
(i) determine a prediction value associated with the pixel according to a first prediction mode, according to which the pixel is predicted from at least one other previously decoded pixel, said other previously decoded pixel belonging to said current block,
(ii) determine a prediction mode for the pixel from the first prediction mode and a second prediction mode according to which the pixel is predicted using a prediction resulting from said group of pixel values in the block,
(iii) code in the data stream an item of information indicating whether the pixel is predicted according to the second prediction mode,
(iv) in response to the item of information indicating that the pixel is predicted according to the second prediction mode:
 (a) select a value of said group according to a distance between the prediction value associated with said pixel compared to the pixel values of the group, and
 (b) replace said prediction value associated with the pixel with said selected value,
(v) calculate a prediction residue associated with said pixel using the prediction value associated with the pixel and the value of said pixel,
(vi) code the prediction residue associated with the pixel in the data stream, and
(vii) reconstruct said pixel using the prediction value associated with the pixel and the decoded prediction residue.

12. A non-transitory computer-readable data medium, comprising instructions of a computer program stored thereon which when executed by a processor of a decoding device configure the decoding device to decode a coded data stream representative of at least one image, said image being split into blocks, the decoding comprising, for at least one block of the image, referred to as a current block:

determining a group of pixel values in the block from previously decoded pixels, and for each pixel of the block:
(i) decoding a prediction residue associated with said pixel,
(ii) determining a prediction value associated with the pixel according to a first prediction mode, according to which the pixel is predicted from at least one other previously decoded pixel, said other previously decoded pixel belonging to said current block,
(iii) decoding from the data stream an item of information indicating whether the pixel is predicted according to a second prediction mode according to which the pixel is predicted using a prediction resulting from said group of pixel values in the block,
(iv) in response to the item of information indicating that the pixel is predicted according to the second prediction mode:
 (a) selecting a value of said group according to a distance between the prediction value associated with said pixel compared to the pixel values of the group, and
 (b) replacing said prediction value associated with the pixel with said selected value, and
(v) reconstructing said pixel using the prediction value associated with the pixel and the prediction residue.

13. A non-transitory computer-readable data medium, comprising instructions of a computer program stored thereon which when executed by a processor of a coding device configure the coding device to code a data stream representative of at least one image, said image being split into blocks, the coding comprising, for at least one block of the image, referred to as a current block:

determining a group of pixel values in the block from previously decoded pixels, and for each pixel of the block:
(i) determining a prediction value associated with the pixel according to a first prediction mode, according to which the pixel is predicted from at least one other previously decoded pixel, said other previously decoded pixel belonging to said current block,
(ii) determining a prediction mode for the pixel from the first prediction mode and a second prediction mode according to which the pixel is predicted using a prediction resulting from said group of pixel values in the block,
(iii) coding in the data stream an item of information indicating whether the pixel is predicted according to the second prediction mode,
(iv) in response to the item of information indicating that the pixel is predicted according to the second prediction mode:
 (a) selecting a value of said group according to a distance between the prediction value associated with said pixel compared to the pixel values of the group, and
 (b) replacing said prediction value associated with the pixel with said selected value,
(v) calculating a quantized prediction residue associated with said pixel using the prediction value associated with the pixel and the value of said pixel, (vi) reconstructing said pixel using the prediction value associated with the pixel and the decoded prediction residue, and
(vii) coding the quantized prediction residue associated with said pixel in the data stream.

\* \* \* \* \*